(12) United States Patent
Ferraro et al.

(10) Patent No.: US 12,459,866 B2
(45) Date of Patent: Nov. 4, 2025

(54) BORON DOPED CEMENT AND CONCRETE

(71) Applicants: University of Florida Research Foundation, Inc., Gainesville, FL (US); RJ LEE GROUP, INC., Monroeville, PA (US); ELECTRIC POWER RESEARCH INSTITUTE, INC., Palo Alto, CA (US)

(72) Inventors: Christopher C. Ferraro, Gainesville, FL (US); Jerry M. Paris, Gainesville, FL (US); James E. Baciak, Gainesville, FL (US); Kyle A. Riding, Gainesville, FL (US); Ashish D. Patel, Gainesville, FL (US); David B. Scott, Charlotte, NC (US); Eric R. Giannini, La Crosse, WI (US)

(73) Assignee: University of Florida Research Foundation, INC., Gainesville, FL (US)

( * ) Notice: Subject to any disclaimer, the term of this patent is extended or adjusted under 35 U.S.C. 154(b) by 475 days.

(21) Appl. No.: 17/919,692

(22) PCT Filed: Apr. 20, 2021

(86) PCT No.: PCT/US2021/028144
§ 371 (c)(1),
(2) Date: Oct. 18, 2022

(87) PCT Pub. No.: WO2022/169472
PCT Pub. Date: Aug. 11, 2022

(65) Prior Publication Data
US 2023/0167025 A1    Jun. 1, 2023

Related U.S. Application Data

(60) Provisional application No. 63/124,348, filed on Dec. 11, 2020, provisional application No. 63/013,393, filed on Apr. 21, 2020.

(51) Int. Cl.
*C04B 22/00* (2006.01)
*C04B 20/10* (2006.01)
*C04B 111/00* (2006.01)

(52) U.S. Cl.
CPC ...... *C04B 22/0013* (2013.01); *C04B 20/1055* (2013.01); *C04B 2111/00862* (2013.01)

(58) Field of Classification Search
CPC ............ C04B 22/0013; C04B 20/1055; C04B 2111/00862; C04B 20/1066; C04B 28/04;
(Continued)

(56) References Cited

U.S. PATENT DOCUMENTS 5,584,927 A    12/1996 Yonezawa et al.
10,590,040 B2 *  3/2020 Ozersky ............... C04B 7/02
(Continued)

FOREIGN PATENT DOCUMENTS

WO    2010048457 A1    4/2010

OTHER PUBLICATIONS

Lee et al. Potential use of borosilicate glass to make neutron shielding mortar: Enhancement of thermal neutron shielding and strength development and mitigation of alkali-silica reaction, Journal of Cleaner Production, 210, 2019, pp. 638-645 (Year: 2019).*

(Continued)

*Primary Examiner* — Amber R Orlando
*Assistant Examiner* — Anastasia A. Kuvayskaya
(74) *Attorney, Agent, or Firm* — Thomas | Horstemeyer LLP.

(57) ABSTRACT

Aspects of the present disclosure provide for cement, cement paste, cementitious paste, cementitious mortar, and concrete, methods of making cement, cement paste, cementitious paste, cementitious mortar, and concrete, structures incorporating the concrete, and the like, where the cement, cement paste, cementitious paste, cementitious mortar, and (Continued)

the concrete include elemental boron and/or one or more boron compounds (e.g., boron-doped cement, cement paste, cementitious paste, cementitious mortar, and concrete). The boron and/or a boron compound can be homogeneously distributed throughout the cement, cement paste, cementitious paste, cementitious mortar and/or concrete.

16 Claims, 3 Drawing Sheets

(58) Field of Classification Search
CPC ......... C04B 28/065; C04B 2111/00258; G21F 1/042
See application file for complete search history.

(56) References Cited

U.S. PATENT DOCUMENTS

| | | | |
|---|---|---|---|
| 2002/0165082 A1* | 11/2002 | Singh | G21F 1/06 588/3 |
| 2018/0114605 A1* | 4/2018 | Chang | C04B 28/04 |
| 2019/0112228 A1 | 4/2019 | Ozersky et al. | |

OTHER PUBLICATIONS

Pomaro et al. A review on radiation damage in concrete for nuclear facilities: from experiments to modeling, Modelling and Simulation in Engineering, 2016, article ID 4165746 (Year: 2016).*

Higginson (ASTM Selected Technical Papers, chapter: Mineral Admixtures, doi: https://doi.org/10.1520/STP49903S, 1966) (Year: 1966).*

Jang et al. "Enhancement of thermal neutron shielding of cement mortar by using borosilicate glass powder." Applied Radiation and Isotopes [online], May 2017 [Retrieved on Jul. 5, 2021], vol. 123, pp. 1-5, Abstract only.

Zhang et al. "Nano boron nitride modified reactive powder concrete." Construction and 1-3, 6-7. 9-12, 15-16, 18—Building Materials [online], Aug. 10, 2018 (Aug. 10, 2018) [Retrieved on Jul. 5, 2021], vol. 20 A 179, pp. 186-197, Retrieved from the Internet: <URL: https://pdf.sciencedirectassets.com/271475/1-s2.0-S0950061818X00166/>, see entire document, especially Abstract; Table 4; para 1; p. 7, para 2; p. 10, para 2; p. 11, para 1.

* cited by examiner

BORON DOPED CEMENT AND CONCRETE

CLAIM OF PRIORITY TO RELATED APPLICATION

This application is the 35 U.S.C. § 371 national stage of PCT Application No. PCT/US2021/028144, filed on Apr. 20, 2021, wherein the PCT application claims priority to, and the benefit of, U.S. provisional application entitled "BORON-DOPED CEMENT AND CONCRETE" having Ser. No. 63/124,348 filed on Dec. 11, 2020, and wherein the PCT application claims priority to, and the benefit of U.S. provisional application entitled "USE OF BORON FOR ASR PREVENTION IN CEMENTITIOUS MATERIALS" having Ser. No. 63/013,393 filed on Apr. 21, 2020, each of which is entirely incorporated herein by reference.

STATEMENT REGARDING FEDERALLY SPONSORED RESEARCH OR DEVELOPMENT

This invention was made with government support under DE-AR0001142 awarded by the United States Department of Energy. The government has certain rights in the invention.

BACKGROUND

The use of specially designed concrete for nuclear structures is required to address specific exposure conditions associated with nuclear reactor operations. In addition to high operational temperatures and varying levels of reinforcement ratios, concrete is subjected to a wide array of radiation energies and types that can deleteriously affect the concrete materials. As concrete is typically used as a biological shield to protect workers from the radiation produced from nuclear power generation, the concrete is typically designed with large amounts of material that is atypical of "normal" concrete. This includes heavyweight aggregates such as steel shot or punchings, iron-rich rocks, and neutron-absorbing materials, to protect against high-energy radiation such as gamma rays, and to protect against neutron radiation.

SUMMARY

The present disclosure provides for cement, cement paste, cementitious paste, cementitious mortar, and concrete, methods of making cement, cement paste, cementitious paste, cementitious mortar, and concrete, structures incorporating the concrete, and the like, where the cement, cement paste, cementitious paste, cementitious mortar, and the concrete include elemental boron and/or one or more boron compounds (e.g., boron-doped cement, cement paste, cementitious paste, cementitious mortar, and concrete).

In an aspect, the present disclosure provides for a concrete composition comprising: a cement paste, a fine aggregate, a coarse aggregate, and one of a mineral admixture and a liquid admixture, wherein when present the mineral admixture, the liquid admixture, or both comprise boron particles, wherein the boron particles comprise a boron compound, elemental boron, or a combination thereof, wherein, optionally, the boron particles have a largest least dimension of about 100 microns or less, wherein the boron particles are dispersed homogeneously in the concrete composition. The boron compound can be selected from the group consisting of: boron minerals, organoboron compounds, borates and their hydrated forms, borate esters and their hydrated forms, borate salts and their hydrated forms, ionic borohydrides, and a combination thereof. The boron content in the concrete composition can be about 0.5-80 kg/m$^3$.

In an aspect, the inclusion of the boron compound, elemental boron, or combinations thereof, does not reduce concrete workability by more than 10% as measured by a slump cone in accordance with ASTM C143 relative to otherwise identical composition without the boron compound, elemental boron, or combinations thereof.

In an aspect, the inclusion of the boron compound, elemental boron, or combinations thereof, does not increase concrete initial or final setting times by more than 5% as measured by a penetration resistance in accordance with ASTM C403 relative to otherwise identical composition without the boron compound, elemental boron, or combinations thereof.

In an aspect, the inclusion of the boron compound, elemental boron, or combinations thereof, does not reduce concrete compressive strength by more than 20% as measured on cylindrical concrete specimens in accordance with ASTM C39 relative to otherwise identical composition without the boron compound, elemental boron, or combinations thereof.

In an aspect, the present disclosure provides for a concrete composition comprising: a cement paste, a fine aggregate, and a coarse aggregate, wherein the cement paste includes homogeneously dispersed cement particles, water, and boron particles, wherein the boron particles comprise a boron compound, elemental boron, or a combination thereof, wherein the boron particles, optionally, have a largest least dimension of about 100 microns or less, wherein the boron particles is dispersed homogeneously in the cement paste.

In an aspect, the cement paste including the boron compound, elemental boron, or combinations thereof, does not reduce concrete workability by more than 10% as measured by a slump cone in accordance with ASTM C143 relative to otherwise identical composition without the boron compound, elemental boron, or combinations thereof.

In an aspect, the cement paste including the boron compound, elemental boron, or combinations thereof, does not increase concrete initial or final setting times by more than 5% as measured by a penetration resistance in accordance with ASTM C403 relative to otherwise identical composition without the boron compound, elemental boron, or combinations thereof.

In an aspect, the cement paste including the boron compound, elemental boron, or combinations thereof, does not reduce concrete compressive strength by more than 20% as measured on cylindrical concrete specimens in accordance with ASTM C39 relative to otherwise identical composition without the boron compound, elemental boron, or combinations thereof.

In an embodiment, the present disclosure provides for a concrete composition comprising: fine aggregate particles and coarse aggregate particles, wherein the fine aggregate particles and coarse aggregate particles each have a neutron shielding coating comprising a boron compound, elemental boron, or a combination thereof, wherein the boron compound is part of boron particles that have a largest least dimension of about 100 microns or less.

BRIEF DESCRIPTION OF THE DRAWINGS

Further aspects of the present disclosure will be more readily appreciated upon review of the detailed description of its various embodiments, described below, when taken in conjunction with the accompanying drawings.

DISCUSSION

Figure 1:
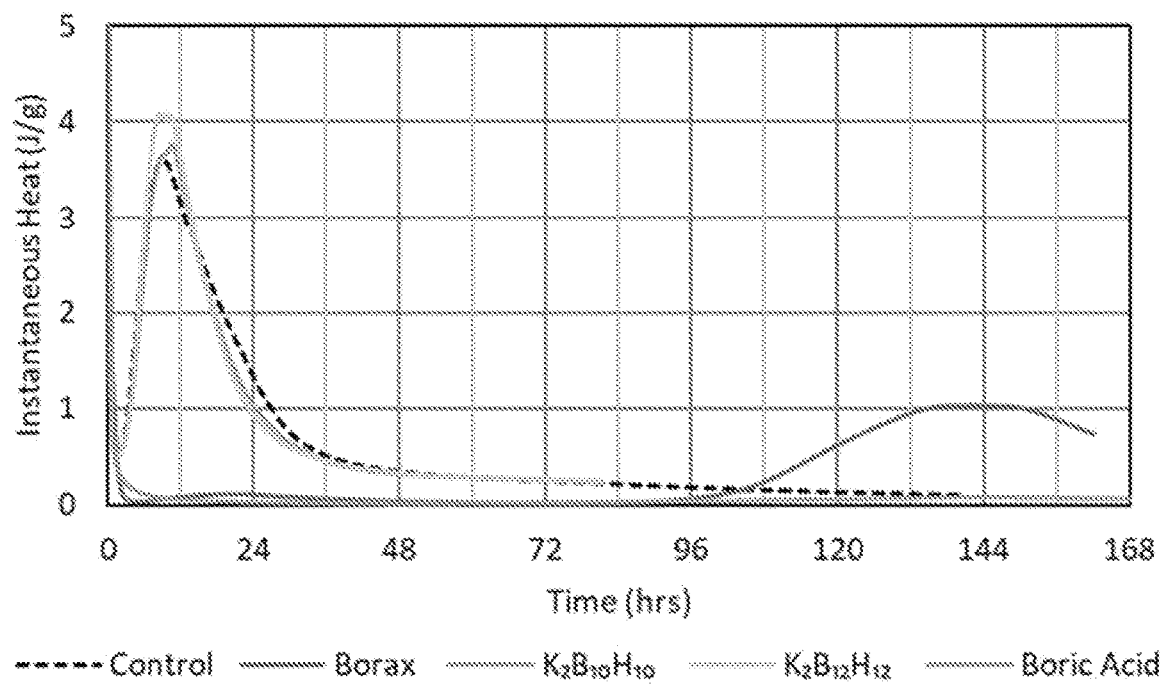
FIG. 1 is a graph of isothermal calorimetry results showing the effect of various highly soluble boron compounds on the hydration time of portland cement paste.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, materials science, mechanical engineering, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by volume, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequences where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

Embodiments of the present disclosure provide for cement, cement paste, cementitious paste, cementitious mortar, and concrete, methods of making cement, cement paste, cementitious paste, cementitious mortar, and concrete, structures incorporating the concrete, and the like, where the cement, cement paste, cementitious paste, cementitious mortar, and the concrete include elemental boron and/or one or more boron compounds (e.g., boron-doped cement, cement paste, cementitious paste, cementitious mortar, and concrete). The boron and/or a boron compound are homogeneously distributed throughout the cement, cement paste, cementitious paste, cementitious mortar and/or concrete. In general, the elemental boron and/or a boron compounds can be in the form of boron particles that have a largest least dimension of ¼" (6 mm) such that it could pass through a sieve opening of that size (e.g., diameter). In an aspect, the boron particles form part of a coating (e.g., a neutron shielding coating) that is around fine aggregate and coarse aggregate used in the preparation of the concrete. The presence of the elemental boron and/or a boron compounds and homogeneous distribution thereof can reduce (e.g., by 80% or more, by 90% or more, by 95% or more) or stop radiation induced volumetric expansion (RIVE) and alkali-silica reaction (ASR) borne from RIVE.

Existing shielding for structural components exposed to neutron radiation (e.g., nuclear reactor buildings/storage/containment/piping/etc.) for nuclear power plants, neutron therapy facilities and the like utilize boron-containing aggregates primarily composed of particle sizes greater than ¼ in. (6 mm) in nominal diameter as a neutron absorber. This application shields the bulk structure, and personnel/equipment within, from neutron radiation, but leaves the near-surface region of the concrete elements exposed to neutron damage due to the heterogeneous dispersion of the aggregates throughout the concrete structure. This is a significant problem because the quartz materials and other crystalline silica minerals of the concrete are degraded over time by neutron radiation, which leads to disorganized lattice structures making the aggregates more susceptible to radiation induced volumetric expansion, and potentially alkali-silica reaction (ASR).

The process of transmutation of elemental boron (specifically isotope Boron-10 ($^{10}$B)) under neutron radiation involves the absorption (or capture) of a single neutron by a single atom of $^{10}B$ to produce an atom of isotopic Lithium-7 ($^{7}Li$), an alpha particle ($\alpha$), and 2.79 MeV of energy. Lithium salts are known to reduce the expansive nature of ASR in concrete structures. However, the mobility of lithium produced via neutron transmutation is on the order of tens of microns from the site of transmutation according to theoretical studies; therefore, the lithium is produced in very close proximity to the boron aggregates and is unable to arrest the development of ASR in concrete, in current use, exposed to neutron radiation despite having boron aggregates due to susceptible silicate aggregates being further than tens of microns away from the boron aggregates; therefore, lithium produced is not in proximity to damaged silicate aggregate.

Aspects of the present disclosure provide for utilizing elemental boron and/or one or more boron compounds that are included in the cement, cement paste, cementitious paste, cementitious mortar, and/or concrete. The elemental boron and/or one or more boron compounds are homogeneously dispersed throughout the concrete and surrounds (e.g., coating) aggregate particles (e.g., quarzitic or otherwise potentially reactive aggregate), such that when the boron has been sufficiently exhausted through transmutation under neutron radiation, sufficient lithium has been produced locally to arrest the expansion from ASR. In this way, the homogeneous dispersion of boron provides shielding material at the exposure surface, providing more even shielding from neutron radiation. Also, the homogeneous dispersion of boron provides active ASR/RIVE mitigation in the places of highest potential for damage; i.e. the areas with highest cumulative neutron exposure will produce lithium in the greatest quantity at the fastest rate.

In general, the most common type of cement is portland cement, but other types of cement (e.g., calcium sulfoaluminate cement and calcium aluminate cements) can be used herein as well. In general, portland cement is a mixture of silica, calcium oxide, with small amounts of alumina and iron oxide. During the preparation of the cement, limestone (calcium carbonate) and silica are heated so hot that they form a melted glassy phase of calcium silicates (mainly dicalcium silicate, and tricalcium silicate), and the alumina and iron are used to lower the melting point and they form calcium aluminate and tetracalcium aluminoferrite (these are minor phases) which take part in other side reactions. Once this glassy mixture melts and cools, it forms clinkers (little balls) where they are ground to a powder along with some gypsum (calcium sulfate) to form cement.

In addition, other materials can be added to the cement during processing or after processing in the formation of the concrete. Additional components can include mineral admixtures, liquid admixtures, and/or cementitious (binder) material. In general, mineral admixtures are solid powders that are added to supplement cement and are things like coal fly ash, ground slag (slag cement), silica fume, metakaolin, etc. In general, liquid admixtures can vary greatly in chemical compositions and desired effects and some common classes include water reducers, plasticizers, accelerators, air-entrainers, air-detrainers, permeability reducing admixtures, etc. In general, cementitious (binder) material is the combination of materials in a cementitious mixture that does not include fine or coarse aggregates, admixtures, reinforcement, or fibers. The cementitious materials can be assigned into two general groups: cementitious (or hydraulic) materials which are materials that react on their own with water, and supplementary cementitious materials which require an initial reaction (usually portland cement hydration) to happen before they can chemically react to form a hard substance (e.g., aggregates are considered separate from cementitious (binder) material). Cementitious/hydraulic materials would include portland cement, cement types other than portland cement, ground slag (slag cement), and ASTM C618 Class C coal fly ash, etc. Supplementary cementitious materials would include things like silica fume, ASTM C618 Class F fly ash, metakaolin, etc.

The fine aggregates can include natural or synthetic sand, crushed stone, or gravel, where the particles can pass through a ⅜-inch (9.5 mm) sieve. The coarse aggregates can include or synthetic natural sand, crushed stone, or gravel, where the particles are greater than 0.19 inch (4.75 mm), or can be about ⅜ to 6 inches (9.5 to 150 mm) in the largest least dimension. The natural gravel and sand can be obtained from a pit, river, lake, or seabed. The crushed aggregate can be obtained by crushing quarry rock, boulders, cobbles, or large-size gravel. Recycled concrete and slags are also sources of aggregate.

The size distribution of the fine aggregates, coarse aggregates, concrete particles, and boron particles as well as other particles in the concrete can have a distribution of sizes. The shapes of the fine aggregates, coarse aggregates, concrete particles, and boron particles as well as other particles in the concrete can vary and be diverse (e.g., spherical, polygonal, random). The size distribution and shape variety can contribute to the characteristics of the concrete.

The cement paste includes cement and water. The cementitious paste includes the cement, optionally cementitious materials, and water. The cementitious mortar includes cementitious paste and fine aggregates (e.g., sand). Concrete includes cementitious mortar and coarse aggregate (e.g., rock).

In general, the boron compounds, elemental boron, or a combination thereof (e.g., in the form of boron particles) are dispersed homogeneously in the cement, cement paste, cementitious paste, cementitious mortar and/or concrete. In an aspect, the boron content in the cement, cement paste, cementitious paste, cementitious mortar and concrete can be about 0.5-80 kg/m$^3$. In an aspect, boron particles that can have a largest least dimension (e.g., diameter for spherical particles) of about 0.004 inches (100 μm) or less. Optionally, the largest least dimension can be about 90 microns or less, about 80 microns or less, or about 70 microns or less. Also, the largest least diameter can be about 1 micron to 100 microns, about 1 micron to 90 microns, about 1 micron to 80 microns, or about 1 micron to about 70 microns. In an aspect, one or more dimensions (e.g., diameter, length, or width) can be about 1 micron to 100 microns, about 1 micron to 90 microns, about 1 micron to 80 microns, or about 1 micron to about 70 microns. In an aspect, some (e.g., about 1% to 20%) of the boron particles can have a largest least dimension of less than 1 micron as well.

The boron content of the cement, cement paste, cementitious paste, cementitious mortar and/or concrete can be about 60-100% derived from one or more of the elemental boron (e.g., natural occurring abundance or isotopically altered) and/or boron compound, where the isotopes of boron can occur in the natural occurring abundance or in an isotopically altered abundance. In an aspect, the boron content of the cement, cement paste, cementitious paste, cementitious mortar and/or concrete can be made so that the abundance of $^{10}B$ is greater than the natural occurring abundance of $^{10}B$. The boron compounds can include: boron minerals, organoboron compounds, borate and their hydrated forms, borate ester and their hydrated forms, borate salt and their hydrated forms, ionic borohydrides, and a combination thereof. The boron minerals can include, for example, colemanite, ulexite, kernite, boracite, painite, tincal, and the like. The organoboron compounds can include boronic acid, orthcarboranes, metacarboranes, paracarboranes, boron carbide, and the like. The borates, borate esters, borate salts, and their hydrated forms can include boric acid, borosilicates, sodium metaborates, lithium metaborates, sodium borates, lithium borates, calcium borates, calcium metaborates, sodium pentaborates, zinc borates, and the like. The ionic borohydrides can include potassium-, lithium-, cesium-, or sodium-dodecahydrododecaborates and the like.

In an aspect, the fine aggregate can include fine aggregate particles and the coarse aggregate can include coarse aggregate particles. The cement, cement paste, cementitious paste can provide a coating (e.g., neutron shielding coating) for each of the fine aggregate particles and the coarse aggregate particles.

In an aspect, the coating reduces radiation-induced volumetric expansion of the one or more types of the fine aggregate particles and the coarse aggregate particles relative to concrete that does not include the coating. In particular, the coating reduces the radiation-induced volumetric expansion by about 5% or more, about 10% or more, about 25% or more, about 50% or more, about 75% or more, or by about 90% or more, and ranges therein (e.g., about 10% to 50%, about 50% to 90%, or the like).

In an aspect, inclusion of the boron compound, elemental boron, or combinations thereof, does not reduce or reduces only by a small amount (e.g., about 5% or less, about 10% or less, about 20% or less, about 30% or less) concrete workability as measured by a slump cone in accordance with ASTM C143 relative to otherwise identical concrete without the boron compound, elemental boron, or combinations thereof.

In an aspect, inclusion of the boron compound, elemental boron, or combinations thereof, does not increase or increases only by small amount (e.g., about 5% or less, about 10% or less, about 20% or less, about 30% or less) the concrete initial or final setting times as measured by a penetration resistance in accordance with ASTM C403 relative to otherwise identical concrete without the boron compound, elemental boron, or combinations thereof.

In an aspect, inclusion of the boron compound, elemental boron, or combinations thereof, does not reduce or reduces only by a small amount (e.g., about 10% or less, about 20% or less, about 30% or less) concrete compressive strength as measured on cylindrical concrete specimens in accordance with ASTM C39 relative to otherwise identical concrete without the boron compound, elemental boron, or combinations thereof.

Having described aspects of the present disclosure, other aspects are not described. As briefly described above, cement can be manufactured using a designed combination of calcium, silicon, aluminum, iron, and other ingredients that can be derived from limestone, shells, and chalk or marble combined with shale, clay, slate, blast furnace slag, silica sand, coal fly ash, and/or iron ore. Optionally, elemental boron or boron compounds can be introduced at this point. These ingredients are brought to a high temperature (e.g., 2,700 and 3,000 degrees Fahrenheit or 1,500 and 1670 degrees Celsius), form small balls called clinkers that are then ground (optionally, elemental boron or boron compounds can be introduced at this point) into the fine powder. In general, limestone and silica make up about 85 percent of the ingredients of cement, while other elements such as alumina and iron oxide are also included as well as the elemental boron or boron compounds. The high heat drives off water and carbon dioxide to form other materials that make up the cement matrix and in a portland cement these can include tricalcium silicate, dicalcium silicate, tricalcium aluminate and tetracalcium aluminoferrite. Other cement types such as calcium aluminate cements (CACs) and calcium sulfoaluminate cements (CSA cements) are comprised of different chemical compounds.

The cement matrix can be mixed with fine and coarse aggregates optionally along with admixtures (optionally, elemental boron or boron compounds can be introduced at this point). In general, the concrete includes about 10 to 25 percent cementitious material, about 60 to 75 percent aggregate and about 5 to 15 percent water. A coating (e.g., neutron shielding coating) is formed around the fine and coarse aggregates. The concrete can be formed through hydration, where the components harden and gain strength to form the concrete.

Additional details are provided regarding various embodiments of the present disclosure. In an aspect, the present disclosure provides for a concrete composition that includes: a cement paste, a fine aggregate, a coarse aggregate, and one of a mineral admixture and a liquid admixture. The mineral admixture, the liquid admixture, or both, when present can include boron particles, where the boron particles comprise a boron compound, elemental boron, or a combination thereof. The boron particles can optionally have a largest least dimension of about 100 microns or less. The boron particles are dispersed homogeneously in the concrete composition. In an aspect, the boron particles can be part of a coating for the fine aggregate particles and the coarse aggregate particles. The coating reduces radiation-induced volumetric expansion of the one or more types of the fine aggregate particles and the coarse aggregate particles relative to concrete that does not include the coating.

In another aspect, the present disclosure provides for a concrete composition that includes a cement paste, a fine aggregate, and a coarse aggregate. The cement paste includes homogeneously dispersed cement particles, water, and boron particles. The boron particles can include a boron compound, elemental boron, or a combination thereof. The boron particles can optionally have a largest least dimension of about 100 microns or less. The boron particles are dispersed homogeneously in the concrete composition. The cement paste provides a coating for each of the fine aggregate particles and the coarse aggregate particles.

In another aspect, the present disclosure provides for a concrete composition including fine aggregate particles and coarse aggregate particles. The fine aggregate particles and coarse aggregate particles each have a neutron shielding coating. The neutron shielding coating includes a boron compound, elemental boron, or a combination thereof. The boron compound is part of the boron particles that can optionally have a largest least dimension of about 100 microns or less. The boron compound, elemental boron, or a combination thereof can reduce radiation-induced volumetric expansion of the one or more types of the fine aggregate particles and the coarse aggregate particles relative to concrete that does not include the boron compound, elemental boron, or a combination thereof. The neutron shielding coating can reduce radiation-induced volumetric expansion of the one or more types of the fine aggregate particles and the coarse aggregate particles relative to concrete that does not include the neutron shielding coating.

Now having described embodiments of the present disclosure, additional details are provided in Examples 1 and 2.

Example 1

Results are shown in Tables 2, 3, and 4, as well as FIGS. 1, 2, 3, and 4. The results in Tables 2, 3, and 4 were obtained by testing concretes containing various boron compounds (e.g., borax, boron trioxide, and boron carbide) with chemical admixtures to adjust plastic properties.

The research illustrated in Table 2 was performed in accordance with ASTM C403, Standard Test Method for Time of Setting of Concrete Mixtures by Penetration Resistance. Without boron addition or chemical accelerators, the initial and final setting times of the concrete mixture was 4.14 hours and 5.58 hours, respectively. Using a typical boron compound such as borax (at a $^{10}$B content of 0.84 lb/yd$^3$) increased the setting times to 36.26 and 47.75 hours. Borax can be one or a combination of compounds having different crystal water content, but the exact mixture is less important than the B content. The Using a high dose of a typical set accelerating admixture (sodium thiocyanate) had little effect. Incorporating boron trioxide with a high dose of a set accelerating admixture (mixture of calcium chloride) produced initial and final setting times of 10.65 and 21.41 hours, respectively. Using boron carbide with a mid-range dose a set accelerating admixture (calcium nitrate and calcium nitrite) produced setting times that were faster than the concrete without boron additions.

The research illustrated in Table 3 was performed in accordance with ASTM C143, Standard Test Method for Slump of Hydraulic-Cement Concrete. The workability of concrete without boron or admixtures as determined by slump test was approximately 4.0 inches for the first ½ hour after mixing and 2.75 inches at 1 hour after mixing. Concrete doped with boron trioxide and calcium chloride resulted in slump that was reduced to approximately 0.25 inches for the first half hour; this level of loss in workability is unacceptable. Mixtures with borax resulted in slumps exceeding 8.0 inches for over two hours when using set accelerating admixtures. Whereas concrete amended with boron carbide with calcium nitrate and calcium nitrite had a slump of approximately 8.0 inches for the first half hour and then returned to approximately 4.75 inches at 1 hour.

The research illustrated in Table 4 was performed in accordance with ASTM C39, Standard Test Method for Compressive Strength of Cylindrical Concrete Specimens. The strength of concrete without boron or admixtures at 7- and 28-days was 4930 psi and 6330 psi; respectively. For concrete with borax without accelerating admixtures, the 7- and 28-day compressive strengths were 59% and 67% of control. For borax with sodium thiocyanate, the 7- and 28-day compressive strengths were 87% and 83% of control. For the boron carbide mix with calcium nitrate and calcium nitrite, the 7- and 28-day compressive strengths were 84% and 80% of the control strengths; however, the 28-day strength had to be tested early (outside of ASTM specifications) due to COVID-19 laboratory closures. Therefore, the 28-day strength for this mixture is expected to be higher.

Figure 2:
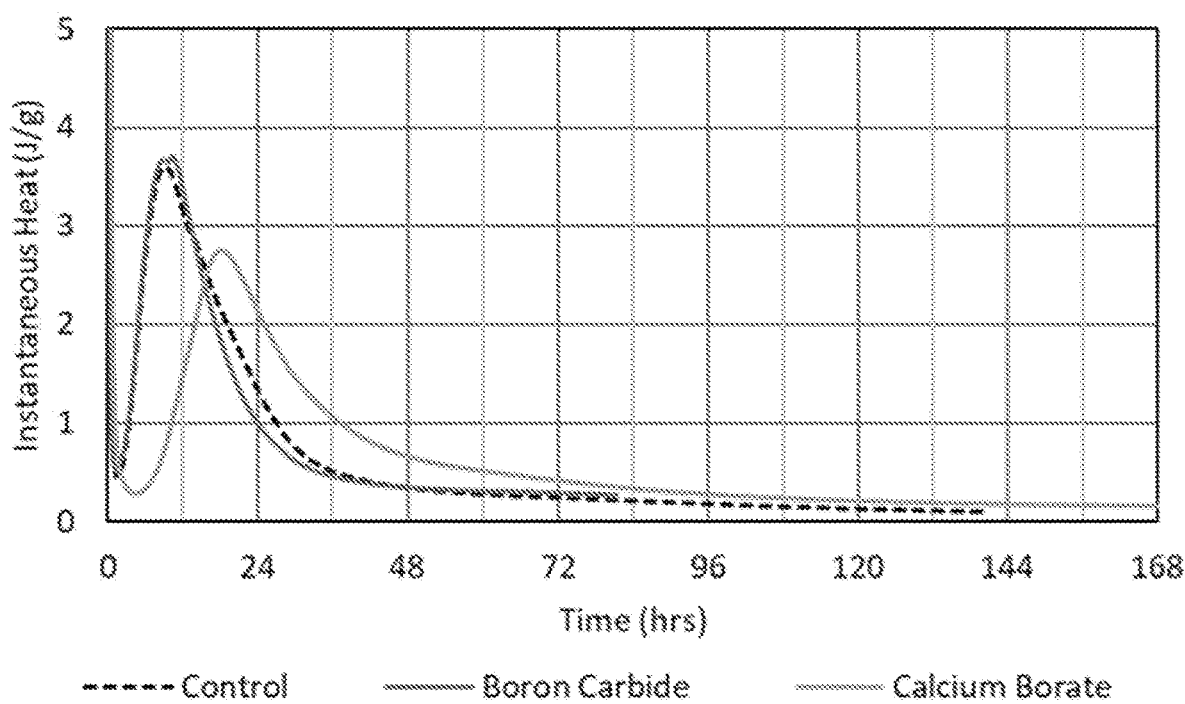
FIG. 2 is a graph of isothermal calorimetry results showing the effect of various less soluble boron compounds on the hydration time of portland cement paste.

The research illustrated in FIGS. 1 and 2 was performed on cement pastes with boron compound additions in accordance with ASTM C1679, Standard Practice for Measuring Hydration Kinetics of Hydraulic Cementitious Mixtures Using Isothermal Calorimetry. All of the boron compounds in FIGS. 1 and 2 were added to portland cement to result in a $^{10}$B content of 0.84 lb/yd$^3$. The results show that the majority of boron compounds, regardless of level of solubility will result in setting time delays; this is confirmed by the time of setting in concrete. The calcium borate shown in FIG. 2 was produced by combining borax with calcium hydroxide at a calcium to boron molar ratio of 0.375, then the material was added to water such that the liquid to solid ratio was 5.91:1 by mass; the mixture was then heated to 80° C. and continuously agitated until the pH of the solution changed approximately from 11 to 13, at which point the precipitate was removed and dried. The typical boron compounds (borax and boric acid) resulted in delays in hydration of 60 to 280 hours. Boron carbide, ionic borohydrides, and calcium borate showed a maximum delay in hydration of approximately 8 hours.

Figure 3:
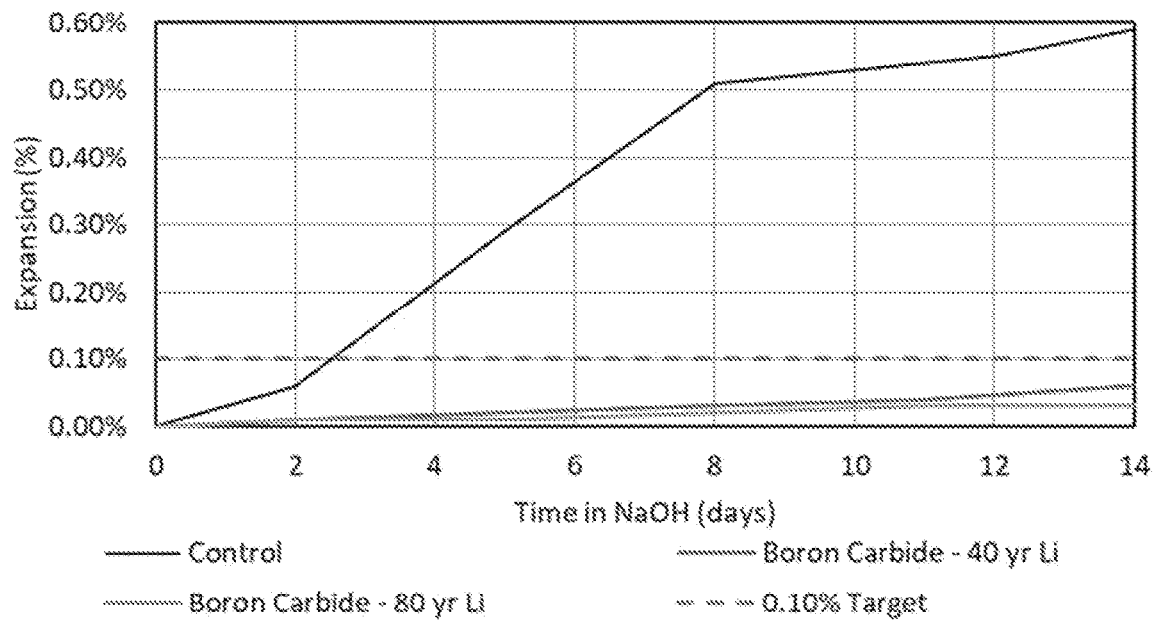
FIG. 3 is a graph of accelerated mortar bar length change results showing the mitigation of expansive alkali-silica reactive aggregate when amended with 40 and 80 year equivalent doses of lithium; tested in accordance with USACE CRD-C 662-10.

The research illustrated in FIG. 3 was performed on mortar bar specimens created with reactive fine aggregate and exposed to 1N sodium hydroxide solution in accordance with USACE CRD-C 662-10, Determining the Potential Alkali-Silica Reactivity of Combinations of Cementitious Materials, Lithium Nitrate Admixture and Aggregate (Accelerated Mortar-Bar Method). As the boron content is provided as a means to produce lithium to prevent alkali-silica reactivity, decades of radiological exposure would be required to convert enough boron to lithium to be effective. In order to simulate radiation exposure over the course of years in a nuclear power plant, the transmutation of boron to lithium, at a specific time (neutron fluence) was estimated as follows:

$$\frac{\text{g of Boron}}{\text{m}^3 \text{ of concrete}} \times \frac{1 \text{ m}^3}{1{,}000{,}000 \text{ cm}^3} \times$$

$$\frac{19.8\%^{10}\text{B}}{\text{Natural B}} \times \frac{\text{Avogadro's number}}{^{10}\text{B Molar Mass}} = \frac{\text{atoms of }^{10}\text{B}}{1 \text{ cm}^3}$$

During transmutation the conversion from $^{10}$B to $^{7}$Li is 1 to 1, and for a given time and neutron flux, the amount of $^{10}$B atoms per gram transmuted into $^{7}$Li atoms can be computed. For instance:

$$\frac{350 \text{ gB}}{\text{m}^3 \text{ of concrete}} \times \frac{1 \text{ m}^3}{1{,}000{,}000 \text{ cm}^3} \times \frac{19.8\%^{10}\text{B}}{\text{Natural B}} \times \frac{6.022 \times 10^{23} \text{ atoms/mol}}{10.013 \text{ g/mol}} \cong$$

$$\frac{2.1 \times 10^{19} \text{ atoms of }^{10}\text{B}}{\text{cm}^3}$$

For a reactor that has a neutron flux of 5×10$^{10}$n/cm$^2$-s, if one presumes that a 1 cm$^3$ volume of concrete is exposed on one side, the exposure surface is 1 cm$^2$; for this flux, and a given time, say 5 years, the total conversion can be calculated as follows:

$$\frac{5 \times 10^{10} n}{\text{cm}^2 - \text{s}} \times \frac{86{,}400 \text{ s}}{\text{day}} \times \frac{365 \text{ d}}{\text{yr}} \times 5 \text{ yr} = 7.88 \times 10^{18} \text{ conversions}$$

Since each conversion results in a single lithium atom being produced from a single $^{10}$B atom, the mass of lithium per m$^3$ can be calculated as follows:

$$\frac{7.88 \times 10^{18} \text{ atoms }^7\text{Li}}{\text{cm}^3} \times$$

$$\frac{\text{Molar Mass of }^7\text{Li}\left(\frac{7.016 \text{ g}}{\text{mol}}\right)}{\text{Avogadro's number}} \times \frac{1{,}000{,}000 \text{ cm}^3}{\text{m}^3} = \frac{91.85 \text{g}^7\text{Li}}{\text{m}^3 - 5 \text{ yr}}$$

The process of transmutation would inevitably result in a gradient of lithium through the bulk of concrete as the depth increases from the surface from exposure; however, the most susceptible portion of concrete would be at the surface which would also be the concrete with the highest dose of lithium. Therefore, this oversimplification is sufficient for mortar testing without the necessity to place specimens into a nuclear reactor for years to investigate potential for alkali-silica reactivity. Additionally, short term exposure to neutron beams typically results in considerable amounts of specimen heating which can damage the microstructure of the specimens which would affect the results.

Once the amount of lithium predicted was calculated, that amount of lithium, in the form of lithium nitrate was added to the mortar specimens during mixing. The 1N NaOH soak solution of the test was also adjusted to contain lithium following USACE test procedure CRD-C 662-10, which causes diffusion of lithium into the samples over the 14-day sodium testing period. The results indicate that at 40 years of exposure, the lithium expected to be produced in a typical nuclear reactor is sufficient to arrest deleterious expansion to a level that would likely be innocuous. The control mixture without lithium dosages expanded to approximately 0.60% at 14 days; CRD-C 662-10 does not give guidance on expansion limits, but a similar test, ASTM C1260 (same testing conditions, but without lithium admixture), states that expansion of less than 0.10% is "indicative of innocuous behavior in most cases" when using a (potentially) reactive aggregate. The lithium dosed mixes representing 40- and 80-years of neutron exposure in a nuclear reactor expanded to approximately 0.05% and 0.03% of the original length.

Figure 4:
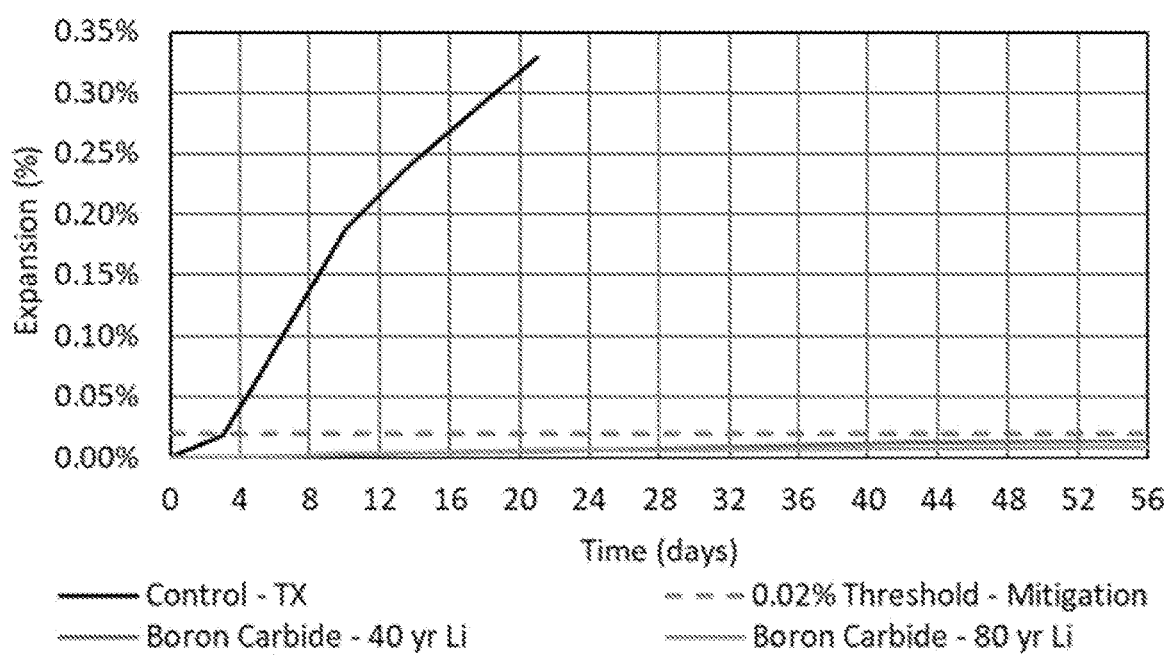
FIG. 4 is a graph of miniature concrete prism test length change results showing the mitigation of expansive alkali-silica reactive aggregate when amended with 40 and 80 year equivalent doses of lithium; tested in accordance with AASHTO T 380.

The research illustrated in FIG. 4 was performed on miniature concrete prisms in accordance with AASHTO T 380, Standard Method of Test for Potential Alkali Reactivity of Aggregates and Effectiveness of ASR Mitigation Measures (Miniature Concrete Prism Test, MCPT). This test method is similar to CRD-C 662-10; however, it is performed on concrete specimens rather than mortar, for a longer exposure period, and at a lower temperature. A similar lithium dosing regime was followed as described in the procedure for CRD-C 662-10. The results of the testing show that the concrete made with predicted lithium dosages confirmed the mitigation potential predicted by CRD-C 662-10. The control concrete (made without lithium) expanded beyond 0.3% of the original length; 0.04% is considered "reactive" and 0.02% is considered to be mitigation. The lithium dosed mixes representing 40- and 80-years of neutron exposure in a nuclear reactor expanded to approximately 0.015% and 0.010% of the original length.

Table 1 presents the mixture proportion for boron-doped concretes that were used to assess the time of set, slump, and compressive strength.

Table 2 presents the initial and final setting times for the boron doped concretes as measured by penetration resistance in accordance with ASTM C403. Typical boron compounds such as borax and boron trioxide are presented with typical chemical set accelerating admixtures.

Table 3 presents the slump of the concrete mixtures over time as measured with a slump cone in accordance with ASTM C143. The slump was measured over various time intervals to show changes in workability.

Table 4 presents the compressive strength of boron-dopes concrete mixes tested using cylindrical specimens in accordance with ASTM C39 at 3, 7, 28, and 91 days.

TABLE 1

Mixture proportions for boron-doped concretes ($^{10}$B load for all mixtures is 0.84 lb/yd$^3$)

| No. | Boron Compound | w/cm | Cement (lb/yd$^3$) | Water (lb/yd$^3$) | Fine Agg (lb/yd$^3$) | Coarse Agg (lb/yd$^3$) | Boron Compound (lb/yd$^3$) | Accelerating Admixture Dosage |
|---|---|---|---|---|---|---|---|---|
| 1 | Control | 0.50 | 590 | 295 | 1203 | 1673 | — | — |
| 2 | Borax | 0.50 | 590 | 295 | 1186 | 1650 | 28.41 | — |
| 3 | Borax | 0.50 | 590 | 295 | 1175 | 1635 | 28.41 | ST$^1$, 27.5 oz./cwt |
| 4 | Borax | 0.50 | 590 | 295 | 1181 | 1643 | 28.41 | CH$^2$, 10.84 lb/yd$^3$ |
| 5 | Boron Trioxide | 0.40 | 590 | 236 | 1233 | 1715 | 13.57 | CaCl$^3$, 64 oz./cwt |
| 6 | Boron Carbide | 0.50 | 590 | 295 | 1187 | 1651 | 5.36 | CN$^4$, 34 oz./cwt |
| 7 | Boron Carbide | 0.45 | 590 | 266 | 1230 | 1711 | 5.36 | — |

$^1$ST = Sodium Thiocyanate
$^2$CH = Calcium Hydroxide
$^3$CaCl = Calcium Chloride
$^4$CN = Calcium Nitrate/Calcium nitrate

TABLE 2

Initial and final setting times for boron-doped concrete mixtures

| Mix No. | Boron Compound | Accelerating Admixture Dosage | Initial Set (Hrs) | Final Set (Hrs) |
|---|---|---|---|---|
| 1 | Control | — | 4.14 | 5.58 |
| 2 | Borax | — | 36.26 | 47.75 |
| 3 | Borax | ST, 27.5 oz./cwt | 33.11 | 39.65 |
| 4 | Borax | CH, 10.84 lb/yd$^3$ | 38.80 | 50.03 |
| 5 | Boron Trioxide | CaCl, 64 oz./cwt | 10.65 | 21.41 |
| 6 | Boron Carbide | CN, 34 oz./cwt | 3.17 | 4.36 |
| 7 | Boron Carbide | — | 3.97 | 5.51 |

TABLE 3

Slump versus time for boron-doped concrete mixtures

| Mix No. | Boron Compound | Accelerating Admixture Dosage | Slump, in inches, at time | | | | | | |
|---|---|---|---|---|---|---|---|---|---|
| | | | 0 hrs | 0.5 hrs | 1 hrs | 1.5 hrs | 2 hrs | 2.5 hrs | 3 hrs |
| 1 | Control | — | 4.0 | 4.0 | 2.75 | — | — | — | — |
| 2 | Borax | — | 6.75 | 9.0 | 8.0 | 4.25 | — | — | — |

TABLE 3-continued

Slump versus time for boron-doped concrete mixtures

| Mix No. | Boron Compound | Accelerating Admixture Dosage | Slump, in inches, at time | | | | | | |
|---|---|---|---|---|---|---|---|---|---|
| | | | 0 hrs | 0.5 hrs | 1 hrs | 1.5 hrs | 2 hrs | 2.5 hrs | 3 hrs |
| 3 | Borax | ST, 27.5 oz./cwt | 9.0 | 8.75 | 8.5 | 8.25 | 8.5 | 7.75 | 7.5 |
| 4 | Borax | CH, 10.84 lb/yd$^3$ | 11.5 | 9.25 | 9.25 | 9.0 | 8.75 | 8.75 | 10.5 |
| 5 | Boron Trioxide | CaCl, 64 oz./cwt | 0.0 | 0.25 | — | — | — | — | — |
| 6 | Boron Carbide | CN, 34 oz./cwt | 8.5 | 8.0 | 4.75 | — | — | — | — |
| 7 | Boron Carbide | — | 6.75 | 4.25 | — | — | — | — | — |

TABLE 4

Compressive strength development of boron-doped concretes

| Mix No. | Boron Compound | Accelerating Admixture Dosage | 3-Day Strength, psi | 7-Day Strength, psi | 28-Day Strength, psi | 91-Day Strength, psi |
|---|---|---|---|---|---|---|
| 1 | Control | — | 3780 | 4930 | 6330 | 6610 |
| 2 | Borax | — | 540 | 2910 | 4220 | 4860 |
| 3 | Borax | ST, 27.5 oz./cwt | 2200 | 4280 | 5240 | 5710 |
| 4 | Borax | CH, 10.84 lb/yd$^3$ | 640 | 2950 | 3780 | 4640 |
| 5 | Boron Trioxide | CaCl, 64 oz./cwt | 3400 | 5560 | 6950 | 7650 |
| 6 | Boron Carbide | CN, 34 oz./cwt | 3730 | 4150 | 5070[1] | 5470 |
| 7 | Boron Carbide | — | 3920 | 4910 | 6320 | 6920 |

[1]Tested at 26 days and 17 hours, which is outside of ASTM C39 specifications, due to laboratory closure during COVID-19.

Example 2

Figure 5:
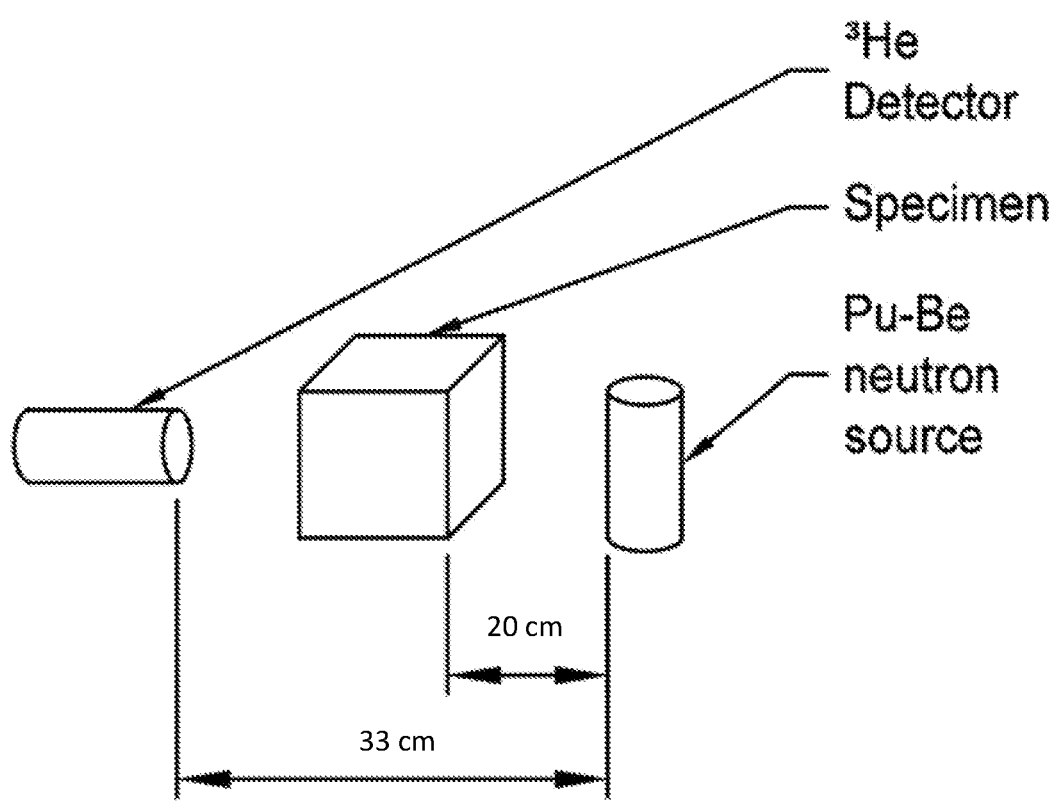
FIG. 5 illustrates a testing apparatus configuration.

Typical concrete was prepared as a baseline material for neutron shielding experimentation. The control concrete specimen was 5 cm in thickness and was placed 20 cm from a 1 Curie plutonium-beryllium source. As illustrated in FIG. 5, a helium-3 detector was placed 33 cm from the source (13 cm from the control specimen) and the number of neutrons passing through the specimen was counted with the detector as shown below. The final shielding efficiency is presented as the percentage of neutrons detected through the specimen compared to the plutonium-beryllium source without shielding.

In this configuration, a 5 cm thick specimen of typical concrete reduced the overall neutrons reaching the detector to 61.4% of the neutrons when no shielding is present (38.6% reduction). Whereas a 1 cm thick coating reduces the neutron fluence to 50.9%; this is better shielding potential with an 80% reduction in material thickness.

When the systems are combined by adding a 1 cm thick coating of this technology to the control concrete, the neutrons passing through are reduced to 42.9% (57.1% reduction).

TABLE 5

Neutron shielding capacity of various combinations of materials.

| Specimen | Neutrons Detected | Normalized Fluence | Reduction/ Shielding |
|---|---|---|---|
| No specimen | 111,643 | 100% | — |
| Control Concrete – 5 cm | 68,571 | 61.4% | 38.6% |
| Coating – 1 cm | 56,810 | 50.9% | 49.1% |
| 5 cm concrete + 1 cm coating | 47,871 | 42.9% | 57.1% |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A concrete composition comprising: a cement paste, a fine aggregate, a coarse aggregate, and an admixture, wherein the admixture is selected from a mineral admixture and a liquid admixture, wherein the mineral admixture, the liquid admixture, or both comprise boron particles, wherein the boron particles comprise a boron compound, wherein the boron particles are dispersed homogeneously in the concrete composition, wherein the boron compound is one of the following: 1) an organoboron compound; 2) a borate ester or their hydrated form; or 3) an ionic borohydride.

2. The concrete composition of claim 1, wherein the admixture is the mineral admixture, wherein the mineral admixture comprises the boron particles.

3. The concrete composition of claim 1, wherein the admixture is the liquid admixture, wherein the liquid admixture comprises the boron particles.

4. The concrete composition of claim 1, wherein the fine aggregate includes fine aggregate particles, wherein the boron particles comprise a coating for the fine aggregate particles, wherein the fine aggregate particles are selected from the group consisting of: natural or synthetic sand, crushed stone, and gravel; wherein the coarse aggregate includes coarse aggregate particles, wherein the boron particles comprise a coating for the coarse aggregate particles, wherein the coarse aggregate particles are selected from the group consisting of: natural or synthetic sand, crushed stone, and gravel.

5. The concrete composition of claim 4, wherein the coating for the fine aggregate particles, the coating for the coarse aggregate particles, or both, reduces radiation-induced volumetric expansion of the one or more types of the fine aggregate particles and the coarse aggregate particles relative to concrete that does not include the coating.

6. The concrete composition of claim 1, wherein the boron content in the concrete composition is about 0.5-80 kg/m$^3$.

7. The concrete composition of claim 6, wherein a $^{10}$B abundance percentage in the boron compound is greater than the natural abundance of about 20 percent.

8. The concrete composition of claim 6, wherein the inclusion of the boron compound does not reduce concrete workability by more than 10% as measured by a slump cone in accordance with ASTM C143 relative to otherwise identical composition without the boron compound.

9. The concrete composition of claim 6, wherein the inclusion of the boron compound does not increase concrete initial or final setting times by more than 5% as measured by a penetration resistance in accordance with ASTM C403 relative to otherwise identical composition without the boron compound.

10. The concrete composition of claim 6, wherein the inclusion of the boron compound does not reduce concrete compressive strength by more than 20% as measured on cylindrical concrete specimens in accordance with ASTM C39 relative to otherwise identical composition without the boron compound.

11. A concrete composition comprising: a cement paste, a fine aggregate, and a coarse aggregate, wherein the cement paste includes homogeneously dispersed cement particles, water, and boron particles, wherein the boron particles comprise a boron compound, wherein the boron particles have a largest least dimension of about 1 micron to 100 microns, wherein the boron particles are dispersed homogeneously in the cement paste, wherein the boron content in the cement paste is about 0.5-80 kg/m$^3$, wherein the boron compound is one of the following: 1) an organoboron compound; 2) a borate ester or their hydrated form; or 3) an ionic borohydride.

12. The concrete composition of claim 11, wherein the fine aggregate includes fine aggregate particles, wherein the boron particles comprise a coating for the fine aggregate particles, wherein the fine aggregate particles are selected from the group consisting of: natural or synthetic sand, crushed stone, and gravel; wherein the coarse aggregate includes coarse aggregate particles, wherein the boron particles comprise a coating the coarse aggregate particles, wherein the coarse aggregate particles are selected from the group consisting of: natural or synthetic sand, crushed stone, and gravel.

13. The concrete composition of claim 11, wherein a $^{10}$B abundance percentage in the boron compound is greater than the natural abundance of about 20 percent.

14. The concrete composition of claim 11, wherein the cement paste including the boron compound does not increase concrete initial or final setting times by more than 5% as measured by a penetration resistance in accordance with ASTM C403 relative to otherwise identical composition without the boron compound.

15. The concrete composition of claim 11, wherein the cement paste including the boron compound does not reduce concrete compressive strength by more than 20% as on measured cylindrical concrete specimens in accordance with ASTM C39 relative to otherwise identical composition without the boron compound.

16. A concrete composition comprising: fine aggregate particles and coarse aggregate particles, wherein the fine aggregate particles and coarse aggregate particles each have a neutron shielding coating comprising a boron compound, wherein the boron compound is part of boron particles that have a largest least dimension of 1 micron to 100 microns, wherein the fine aggregate particles are selected from the group consisting of: natural or synthetic sand, crushed stone, and gravel, wherein the coarse aggregate particles are selected from the group consisting of: natural or synthetic sand, crushed stone, and gravel, wherein the boron content in the concrete composition is about 0.5-80 kg/m$^3$, wherein the boron compound is one of the following: 1) an organoboron compound; 2) a borate ester or their hydrated form; or 3) an ionic borohydride.

* * * * *